US009172779B1

(12) United States Patent
Ellis

(10) Patent No.: US 9,172,779 B1
(45) Date of Patent: *Oct. 27, 2015

(54) WIRELESS BROADBAND MODEM FOR MOBILE DEVICE CONNECTOR

(71) Applicant: Chrysalis, LLC, Cincinnati, OH (US)

(72) Inventor: Nathanael Charles Ellis, Cincinnati, OH (US)

(73) Assignee: Chrysalis, LLC, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/445,093

(22) Filed: Jul. 29, 2014

Related U.S. Application Data

(62) Division of application No. 13/940,959, filed on Jul. 12, 2013, now Pat. No. 8,818,453, which is a division of application No. 13/047,748, filed on Mar. 14, 2011, now Pat. No. 8,494,582.

(51) Int. Cl.
    *H04M 1/00* (2006.01)
    *H04M 1/02* (2006.01)
    *H04W 92/08* (2009.01)

(52) U.S. Cl.
    CPC .......... *H04M 1/0254* (2013.01); *H04M 1/0274* (2013.01); *H04W 92/08* (2013.01)

(58) Field of Classification Search
    CPC .. H04W 88/02; H04W 88/06; H04M 1/72575
    USPC ................. 455/41.2, 556.1, 557, 73, 90.1
    See application file for complete search history.

(56) References Cited

U.S. PATENT DOCUMENTS

| 5,870,615 | A | 2/1999 | Bar-On et al. | |
|---|---|---|---|---|
| 6,243,578 | B1 | 6/2001 | Koike | |
| 6,298,245 | B1 | 10/2001 | Usui et al. | |
| 6,516,202 | B1 * | 2/2003 | Hawkins et al. | 455/556.2 |
| 7,215,977 | B2 * | 5/2007 | Glover | 455/556.1 |
| 7,385,941 | B2 | 6/2008 | Lin | |
| 7,610,068 | B2 * | 10/2009 | Mok | 455/575.3 |
| 7,668,231 | B2 * | 2/2010 | Miller | 375/222 |
| 7,715,867 | B2 | 5/2010 | He et al. | |
| 7,899,397 | B2 * | 3/2011 | Kumar | 455/41.2 |
| 8,032,182 | B2 | 10/2011 | Bennett | |
| 8,494,582 | B1 * | 7/2013 | Ellis | 455/556.1 |
| 8,818,453 | B1 * | 8/2014 | Ellis | 455/556.1 |

* cited by examiner

*Primary Examiner* — Sonny Trinh
(74) *Attorney, Agent, or Firm* — Wood, Herron & Evans, LLP

(57) ABSTRACT

A cellular modem device that is integrated with a proprietary dock connector of a mobile device, such as the proprietary 30 pin dock connector of an iPod Touch or iPad, permits the mobile device to connect for Internet access to the associated cellular carrier. The device is usable in circumstances where the mobile device does not contain internal cellular modem circuitry, and/or the device is unable to use WiFi-based Internet and/or the device's internal cellular circuits are out of range of cellular service of the carrier for which those circuits are designed, and/or the internal cellular circuits are not activated on the associated cellular network.

6 Claims, 3 Drawing Sheets

WIRELESS BROADBAND MODEM FOR MOBILE DEVICE CONNECTOR

RELATED APPLICATIONS

The present application claims priority to U.S. Ser. No. 13/940,959 filed Jul. 12, 2013 which claims priority to U.S. Ser. No. 13/047,748 filed Mar. 14, 2011, now U.S. Pat. No. 8,494,582, which claims priority to U.S. Ser. No. 61/340,030 filed Mar. 12, 2010, the disclosures of which are hereby incorporated herein by reference in its entirety.

FIELD OF THE INVENTION

The present invention relates to accessories for portable computing devices such as palm and tablet sized devices.

BACKGROUND OF THE INVENTION

In recent years the development of computing devices has increasingly focused upon mobility and ease of use. This focus has led to increasingly more sophisticated palm-sized mobile computing devices. Two examples of such devices, sold by Apple, are the iPod Touch and iPhone. Both offer a wide array of functions, including networked applications whereby a user can access email, browse web pages, and the like. The primary difference between the iPod Touch and iPhone is that the iPhone includes a telephone function (and microphone), and has more ways to obtain Internet access. The iPod Touch can obtain Internet access only via 802.11x networking (WiFi), whereas the iPhone is capable of Internet access via either WiFi networking or by a cellular Internet connection, either using GSM networks (for older iPhones) or, more recently, using the Verizon CDMA network (for the iPhone 4 as sold by Verizon).

A more recent product from Apple is the iPad, which was released in early 2010 and was a tremendous sales success. The iPad is functionally similar to an iPod Touch but has a larger screen. Notably, the original iPad can only obtain Internet access via WiFi networking as it does not have a GSM or CDMA modem.

Recently, the iPad 2 has been announced and sold. The iPad 2 differs from the original iPad in the option of including a cellular modem. However, this option comes at an extra price, and may not be purchased by all users; moreoever, there are a large number of iPad and iPod Touch devices in the field which lack cellular Internet capability.

At least one cellular carrier, Verizon, has sold iPad devices bundled with a cellular WiFi hotspot device, allowing the iPad to obtain Internet access while away from wired Internet service, such as in moving vehicles and the like. This is a reasonable solution technically, but involves a substantial hardware cost for the separate device which has its own battery, WiFi router, and cellular modem, which must be absorbed in the up-front purchase price or through a long term service contract.

Thus, there is a need for a device that can provide a cellular Internet option for mobile devices that lack a built-in cellular Internet capability, without substantial hardware cost.

SUMMARY OF THE INVENTION

In accordance with principles of the present invention, this need is met by a cellular modem integrated with a proprietary dock connector of a mobile device, such as the proprietary 30 pin dock connector of an iPod Touch or iPad. The cellular modem is provided inside of a housing sized to conveniently attach to the mobile device, and is installed by plugging the modem into the proprietary connector. The modem draws power from the connected mobile device, and is activated by an application on the mobile device to connect for Internet access to the associated cellular carrier. The application on the mobile device permits the user to connect via the device to a cellular broadband Internet service. This is particularly useful in circumstances where the mobile device does not contain internal cellular modem circuitry, as is the case in the iPod Touch and original iPad, and the device is unable to use WiFi-based Internet. Another prospective application would arise where the device's internal cellular circuits are out of range of cellular service of the carrier for which those circuits are designed (such as, for example, when a CDMA iPhone is taken overseas to a country that complies with GSM standards) or the internal cellular circuits are not activated on the associated cellular network.

The application used on the device will configure the device for connection to the to the cellular network, such as by providing payment or account information which may be forwarded via the device to the cellular carrier. It is anticipated that the device may be enabled on either or both of a long term contract, or short term, pay-as-you-go usage. The device may be relatively low cost owing to the small amount of circuitry required, thus outright purchase of the device by a consumer for pay-as-you-go use.

In various anticipated applications, the device may be used alternately by several devices using the same proprietary connector, such that the device provides the potential for Internet access to several consumers, spreading the cost of acquisition and thus making the cost of acquisition easier to justify.

In one in possible application a device utilizing the connector may, via WiFi networking in the fashion of the iPhone "personal hotspot" (or any other ad-hoc or infrastructure mode networking) share the cellular Internet connection available through the device with other nearby devices, thus permitting the use of a "personal hotspot" type of functionality without requiring the purchase of a later generation iPhone or Android device that natively supports this function.

The invention is directed to mobile devices that do not include a USB connector and cannot be used with known cellular modems designed for connection to a standard USB connector; rather, the device as described herein is integrated with a proprietary dock connector, where "proprietary" is used to refer to a connector that is originated by one manufacturer for use predominantly by that manufacturer's products and for compatible accessories for those products, whether or not the accessories are necessarily under license from the original equipment manufacturer—such as is the case with the Apple dock connector found on the iPod, iPhone and iPad products.

DETAILED DESCRIPTION OF THE INVENTION

Figure 1:
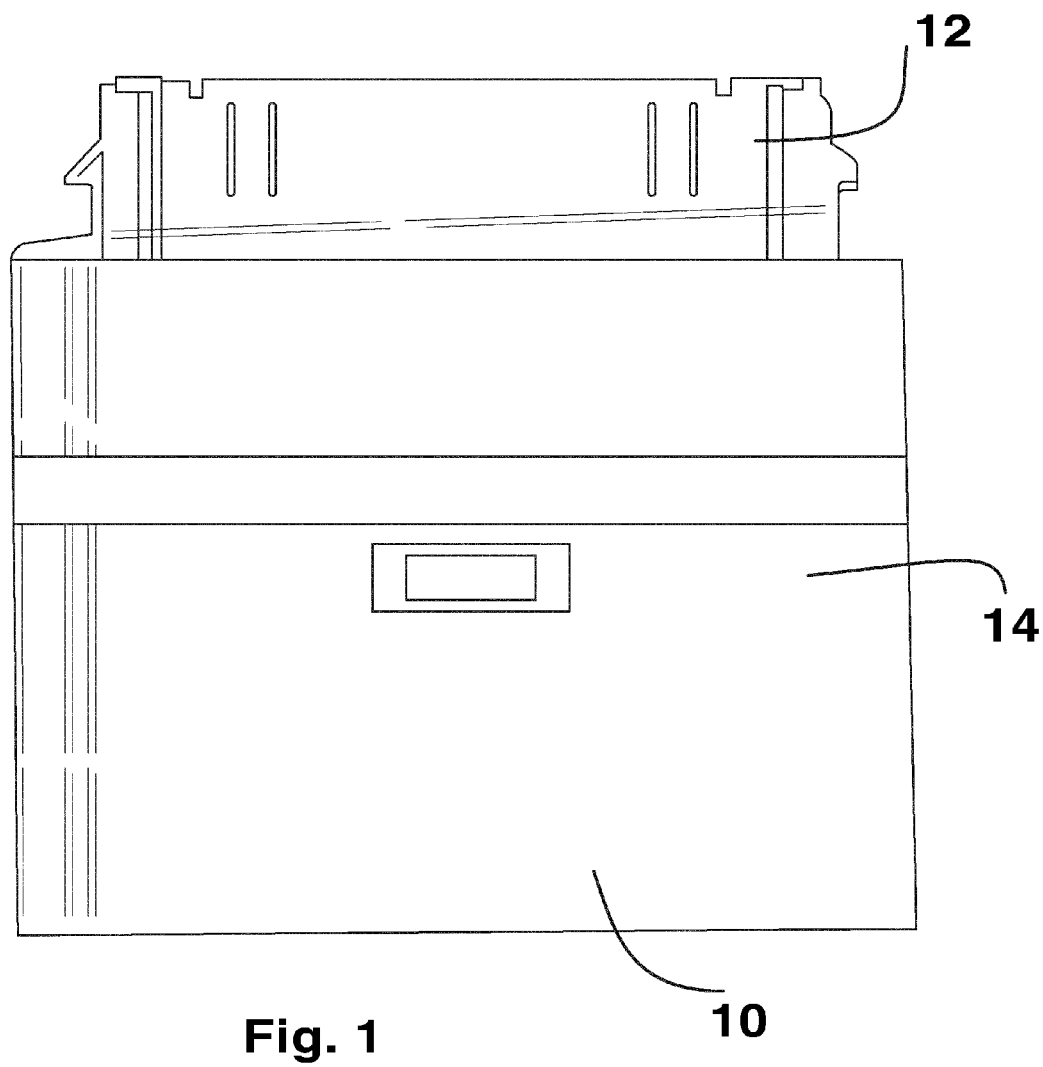
FIG. 1 is a perspective top view Illustration of a mobile device accessory in accordance with principles of the present invention.

FIG. 1 provides a perspective top view of a mobile device accessory 10 in accordance with principles of the present invention. The device is enclosed within a housing 14 of, e.g., plastic, that is shaped and colored for intuitive compatibility with the design language of the device for which it is intended to be used. In the illustrate example the device is intended for use with Apple products using the 30-pin dock connector 12 of the iPod Touch, iPhone and iPad, thus the housing would typically be of white or black plastic similar to that used on the device.

Figure 2:
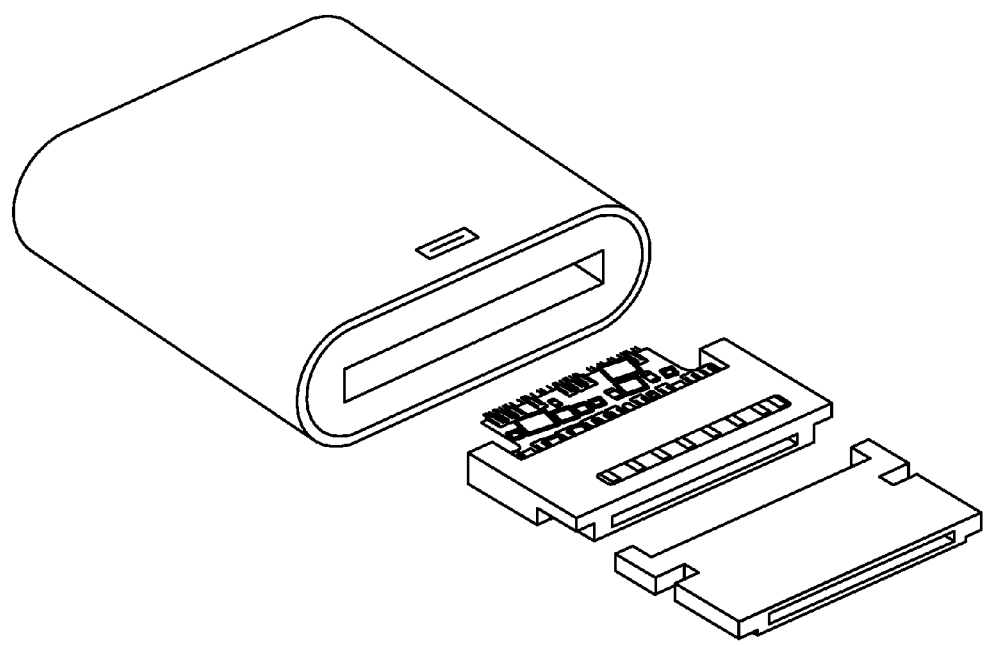
FIG. 2 is an exploded view of the mobile device accessory of FIG. 1 showing the housing, internal circuit board, and an optional mating connector aperture.

FIG. 2 is an exploded view of the mobile device accessory of 10 FIG. 1 showing the housing 14, internal circuit board 16, and an optional mating connector aperture 12.

Figure 3:
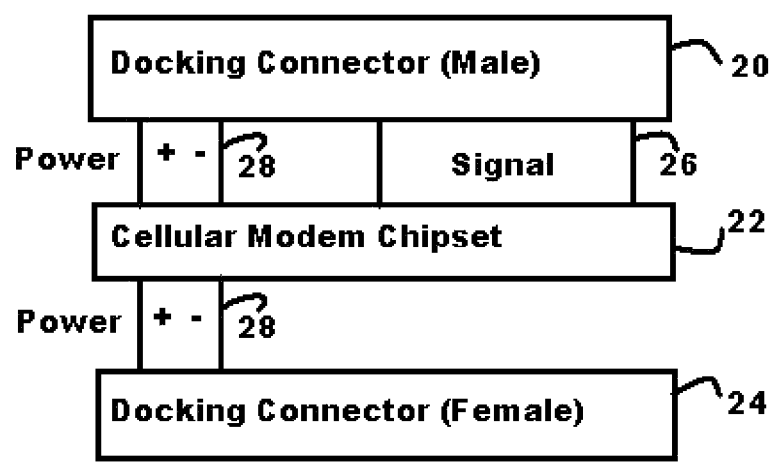
FIG. 3 is a block diagram of the circuitry utilized by the circuit board of the accessory of FIGS. 1 and 2.

FIG. 3 is a block diagram of the circuitry utilized by the circuit board of the accessory of FIGS. 1 and 2. The circuitry includes a male docking connector 20, connected to a cellular modem chipset 22, and to a female docking connector 24. The signal connections of the male docking connector are coupled to the modem chipset so that the connected iPod Touch, iPad or iPhone may communicate with and control the cellular modem chipset.

An exemplary modem chipset is the AnyDATA DTP-600W 3G GSM modem. This chipset includes an high speed packet access module that will operates globally on tri-band UMTS 850/1900/2100 wireless networks as well as quad-band GSM/GPRS/EDGE 850/900/1800/1900 networks. The module transmits data at broadband speeds of 3.6 Mbps downlink and 384 kbps uplink.

The pins of the 30-pin dock connector of the Apple devices are used as follows:

| Pin | Signal | Description |
|---|---|---|
| 1 | GND | Ground (−), internally connected with Pin 2 on iPod motherboard |
| 2 | GND | Audio & Video ground (−), internally connected with Pin 1 on iPod motherboard |
| 3 | Right | Line Out - R (+) (Audio output, right channel) |
| 4 | Left | Line Out - L(+) (Audio output, left channel) |
| 5 | Right In | Line In - R (+) |
| 6 | Left In | Line In - L (+) |
| 8 | Video Out | Composite video output (only when slideshow active on iPod Photo) or Component Video Pb |
| 9 | S-Video Chrominance output | for iPod Color, Photo only or Component Video Y |
| 10 | S-Video Luminance output | for iPod Color, Photo only or Component Video Pr |
| 11 | AUDIO_SW | If connected to GND the iPhone sends audio signals through pin 3-4, otherwise it uses onboard speaker. |
| 12 | Tx | ipod sending line, Serial TxD |
| 13 | Rx | ipod receiving line, Serial RxD |
| 14 | RSVD | Reserved |
| 15 | GND | Ground (−), internally connected with pin 16 on iPod motherboard |
| 16 | GND | USB GND (−), internally connected with pin 15 on iPod motherboard |
| 17 | RSVD | Reserved |
| 18 | 3.3 V | 3.3 V Power (+) Stepped up to provide +5 VDC to USB on iPod Camera Connector. If iPod is put to sleep while Camera Connector is present, +5 VDC at this pin slowly drains back to 0 VDC. |
| 19, 20 | +12 V | Firewire Power 12 VDC (+) |
| 21 | Accessory Indicator/ Serial enable | Different resistances indicate accessory type: 1 kOhm - iPod docking station, beeps when connected 10 kOhm - Takes some iPods into photo import mode 6.8 kΩ - Serial port mode. Pin 11-13 are TTL level. Requires MAX232 chip to convert to RS232 levels. 68 kOhm - makes iPhone 3g send audio through line-out without any messages 500 kOhm - related to serial communication/used to enable serial communications Used in Dension Ice Link Plus car interface 1 MOhm - Belkin auto adaptor, iPod shuts down automatically when power disconnected Connecting pin 21 to ground with a 1 MOhm resistor does stop the ipod when power (i.e. Firewire-12 V) is cut. Looks to be that when this pin is grounded it closes a switch so that on loss of power the Ipod shuts off. Dock has the same Resistor. |
| 22 | TPA (−) | FireWire Data TPA (−) |
| 23 | 5 VDC (+) | USB Power 5 VDC (+) |
| 24 | TPA (+) | FireWire Data TPA (+) |
| 25 | Data (−) | USB Data (−) |
| 26 | TPB (−) | FireWire Data TPB (−) |
| 27 | Data (+) | USB Data (+) |
| 28 | TPB (+) | FireWire Data TPB (+) |
| 29, 30 | GND | FireWire Ground (−) |

Back side of dock connector;
2 4 6 8 10 12 14 16 18 20 22 24 26 28 30
1 3 5 7 9 11 13 15 17 19 21 23 25 27 29

The USB or firewire data pins may, for example, be used for communication with the external chipset for data communication and control of the modem in accordance with the protocols of the chipset in use. In the event that limitations arise from using these particular pins, other pins including analog pins may be used for modulated data communication, using modulation methods known to those of skill in the art.

Notably, in FIG. 3, the power and ground connections 28 of the male and female connector are coupled together and to the cellular modem chipset, such that a source of DC power (such as a USB connector or AC adapter with a USB plug) may be connected to the female connector, and then the device's male connector plugged into the dock connector of an iPod Touch, iPad or iPhone, and in this way power can be supplied to the cellular modem as well as to the iPod Touch, iPad or iPhone from an external source to maintain charge while the cellular modem is in use.

It will be appreciated that a novel and inventive mobile device accessory, and novel applications therefor, have been described here. Applicant does not intend by this description and the details thereof to limit the scope of the invention being sought to be protected, but rather, that protection is to be defined by reference to the following claims.

The invention claimed is:

1. A cellular accessory for use with a proprietary docking connector of a mobile device, comprising
   a. a circuit board incorporating a cellular modem and a mating proprietary docking connector matable to the proprietary docking connector of the mobile device,
   b. the circuit board including power circuitry connected to pins of the mating proprietary docking connector and further comprising 802.11x circuitry to communicate with the mobile device or another nearby mobile device, and provide cellular Internet access to one or more mobile devices via 802.11x communications, the circuit board operating as a gateway for Internet communications of said other devices via 802.11x communications to said 802.11x circuitry and then via said cellular modem of said cellular accessory.

2. The cellular accessory of claim 1 wherein the mating proprietary docking connector is the 30 pin dock connector used in Apple products.

3. The cellular accessory of claim 1 further comprising a housing sized to match the mobile device when the accessory is installed in the mobile device.

4. The cellular accessory of claim 1 wherein the circuit board further comprises a second connector for connection to a source of power, the circuit board passing power obtained from the second connector to the mating proprietary docking connector and then to the docking connector of the mobile device.

5. The cellular accessory of claim 4 wherein the second connector of the accessory and the proprietary docking connector of the mobile device are female docking connectors, each for receiving a compatible male docking connector.

6. A method of using a cellular accessory connected to a mobile device via a proprietary docking connector of the mobile device, comprising,
   a. connecting a mating proprietary docking connector of the cellular accessory to the proprietary docking connector of the mobile device,
   b. connecting via 802.11x circuitry to the mobile device and communicating Internet traffic between said mobile device and cellular accessory via 802.11x communication while said accessory is connected to said docking connector, and
   c. connecting via 802.11x circuitry to another device near to said mobile device, and providing a gateway for Internet communications of said other device via 802.11 communications to said 802.11x circuitry and then via said cellular modem of said cellular accessory.

* * * * *